(12) United States Patent
Rosen et al.

(10) Patent No.: US 10,334,328 B1
(45) Date of Patent: Jun. 25, 2019

(54) AUTOMATIC VIDEO GENERATION USING AUTO-ADAPTIVE VIDEO STORY MODELS

(71) Applicant: Render Inc., Oakland, CA (US)

(72) Inventors: Daniel Josh Rosen, Oakland, CA (US); Jonathan Rosen, San Francisco, CA (US)

( * ) Notice: Subject to any disclaimer, the term of this patent is extended or adjusted under 35 U.S.C. 154(b) by 0 days.

(21) Appl. No.: 15/875,808

(22) Filed: Jan. 19, 2018

Related U.S. Application Data

(60) Provisional application No. 62/448,392, filed on Jan. 20, 2017.

(51) Int. Cl.
| | | |
|---|---|---|
| *G06F 3/048* | (2013.01) | |
| *H04N 21/8549* | (2011.01) | |
| *G11B 27/031* | (2006.01) | |
| *G06N 20/00* | (2019.01) | |
| *G06F 16/78* | (2019.01) | |
| *G06F 16/783* | (2019.01) | |

(52) U.S. Cl.
CPC ......... *H04N 21/8549* (2013.01); *G06F 16/78* (2019.01); *G06F 16/783* (2019.01); *G06N 20/00* (2019.01); *G11B 27/031* (2013.01)

(58) Field of Classification Search
CPC ... H04N 21/8549; G06F 16/783; G06F 16/78; G06N 20/00; G11B 27/031
USPC .......................................................... 715/723
See application file for complete search history.

(56) References Cited

U.S. PATENT DOCUMENTS

| | | | |
|---|---|---|---|
| 8,982,132 B2* | 3/2015 | Blas, Jr. | G06T 13/00 345/427 |
| 10,084,611 B2* | 9/2018 | Hersche | G09B 29/00 |
| 2016/0027198 A1* | 1/2016 | Terry | G06F 16/00 345/473 |
| 2016/0353182 A1* | 12/2016 | Hellier | H04N 21/4307 |

* cited by examiner

*Primary Examiner* — David Phantana-angkool
(74) *Attorney, Agent, or Firm* — David Ahn

(57) ABSTRACT

A video processing system generates and automatically updates videos. A client inputs a smart script that defines general preferences and information to include in a video. The video processing system generates a model of the story from the smart script. A story model comprises story beats that define order and characteristics of information that is presented in a story. The video processing system accesses client content (e.g., video clips, images, and testimonials from a client website) and assigns content items to story beats. The story model and associated content is rendered into a video. The video processing system can then adapt the story model in response to viewer feedback, external events, or other client-supplied parameters. Adapting the story model may include reordering, adding, or removing story beats, or altering parameter values associated with story beat characteristics. Thus, the video processing system can iteratively improve and update a video automatically.

20 Claims, 6 Drawing Sheets

AUTOMATIC VIDEO GENERATION USING AUTO-ADAPTIVE VIDEO STORY MODELS

CROSS-REFERENCE TO RELATED APPLICATION

This application claims a benefit of U.S. Provisional Application No. 62/448,392, filed Jan. 20, 2017, which is incorporated by reference in its entirety.

BACKGROUND

Field of Art

This disclosure relates generally to automatic video generation, and in particular to generating iterations of video narratives by improving story models using machine learning.

Description of Art

The creation of videos can be an arduous un-scalable task, especially if a video needs to be updated regularly to remain relevant. In particular, after a video has been produced, there are few available methods for automatically updating the video. As a result, most individuals or small businesses who want a video for promotional, informative, or other purposes purchase a single expensive video and have no way of adjusting the content of the video to reflect changes (e.g., if a small restaurant updates its menu and wants the new menu to show in the video).

In some cases, developers have addressed this issue by specifically creating templated videos. Such a solution involves a single video template with specific areas to which different content can be inserted to customize and update the video. However, all instances of videos created and updated with this technique look similar, rendering them uninteresting to viewers since the overall structure of the videos does not change. For example, thousands of templated videos promoting real estate agents look exactly the same except for the photo of the realtor and an address of the agency.

SUMMARY

Embodiments relate to a video processing system that automatically generates and updates videos that are based on adaptable video story models. To avoid the generation of videos for different clients that all look the same, a client, upon first requesting a video, provides the video processing system with a smart script document that generally describes a variety of possible video segments (also referred to as "story beats") that can be used in a video. The client also provides the video processing system with content in the form of media asset items that may be used in the video, or provides the video processing system with access information (e.g., resource locators on the Internet) where media assets related to the client may be found.

The video processing system collects media asset items that are needed to render video sections as described in the smart script. The video processing system also constructs a story model based on the information in the smart script. In one embodiment, a story model comprises a sequence of story beats with associated parameter values that define characteristics of the story as it is to be rendered in a video. The video processing system may use trained algorithms to adjust the values of parameters for individual story beats and to adjust the number and order of the story beats within the story model.

Collected media assets are linked to story beats in the story model. The video processing system renders a video based on the story model using the linked media assets and may publish the video or provide the video for publication by the requesting client. The video processing system can automatically update the content of the video over time by collecting and linking newly available media asset items to the story model and re-rendering the video. The video processing system can also update the story model in response to viewer feedback metrics. Thus the video narrative may be improved over time to remain relevant and to be more engaging to viewers.

Figure 1:
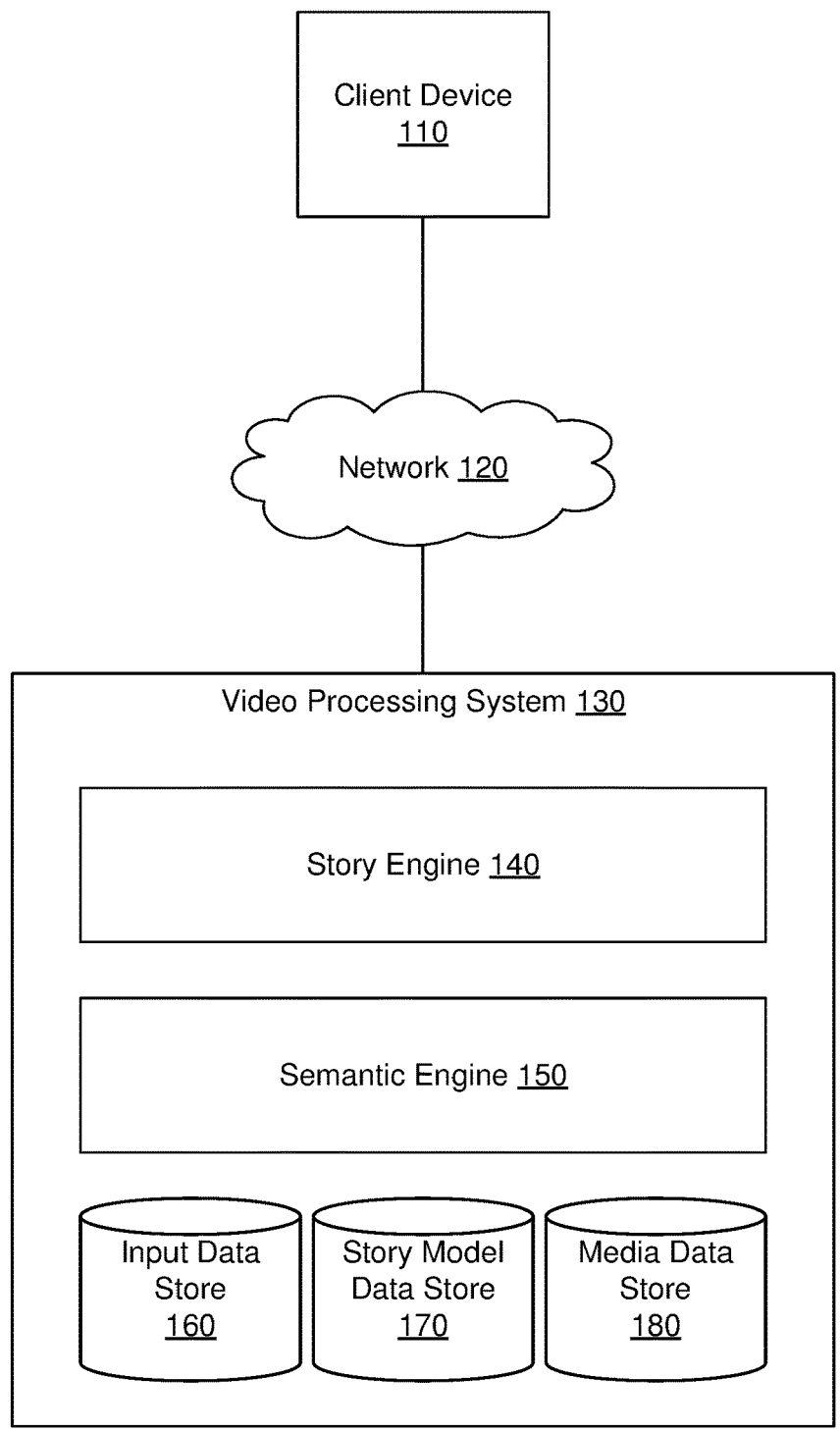
FIG. 1 is a high level block diagram of a system environment for a video processing system, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Videos are a versatile and engaging medium for conveying information to an audience. A video can distribute information using many presentation formats including still images, moving images, audio, and text. Videos can also be used to present different kinds of information, for example, news, entertainment, advertisements, and the like. However, producing video content can require time, money, and resources that are not readily available. This problem is exacerbated for situations in which video content needs to be highly personalized or frequently updated. For example, a real estate agent may want a promotional video that shows houses that are currently available in a community.

In some cases, individuals and small to medium-sized businesses may use a system that populates a simple video template with content. Although they may be able to manually update the content over time, all videos based on the same template look similar, which makes it difficult for the content to stand out and interest viewers. For example, a thousand videos designed with a simple template to promote realtors may look almost identical except for the photo of the realtor and the address of the real estate agency.

The video processing system described herein automatically generates custom videos without requiring undue time, money, and effort to produce each new video. In particular, the video processing system may be provided with a selection of content and general parameters for a video. The video processing system generates a video that conforms with the parameters using provided content. The video processing system can also automatically update the video content and structure when new content is available and can also adapt the video in view of viewer feedback metrics.

A client provides preferences and parameters for a video. The client may also provide content or locations (e.g., on the Internet) where the video processing system can locate content, for example, a universal resource locator for a client website.

The video processing system adjusts values for story beat parameters and reorders story beats within the story model. To generate a video, the video processing system accesses content that matches the parameters of each story beat and assembles the content to create a video that matches the story model. The number, length, order, and parameter values of story beats may be adjusted when a video is updated. For example, a machine model may be used to update values associated with story beat parameters based on viewer feedback metrics. In this way a video can be updated automatically and improved over time.

A story model, as described herein, refers to a sequence of story beats with associated parameter values that define characteristics of the story as it is to be rendered in a video. A story model may be embodied as an n-dimensional vector with values corresponding to each of n story characteristics. That is, a story model may be an ordered sequence of story beats, for example, where each story beat is represented by parameter values for each of the n dimensions of story characteristics. The story model may include information about types of content to use in the video, parameters affecting aspects of the video, and an order in which story beats occur within the video.

A story beat, as described herein, refers to a generalized data representation of a video segment that may be used in a part of a story model. That is, a story beat may include parameter values associated with characteristics of a point in the video. For example, parameter values in a story beat may indicate that a segment of the video should last for 3 seconds, should be animated, and should include sad music.

System Architecture

FIG. 1 is a high level block diagram of a system environment for a video processing system 130, in accordance with an embodiment. FIG. 1 includes client devices 110, a network 120, and the video processing system 130. For clarity, only one client device 110 is shown in FIG. 1. Alternate embodiments of the system environment can have any number of client devices 110 as well as multiple video processing systems 130. The functions performed by the various entities shown in FIG. 1 may vary in different embodiments.

The video processing system 130 may generate and modify videos in response to input parameters and viewer feedback. The video processing system 130 includes a story engine 140, a semantic engine 150, an input data store 160, a story model data store 170, and a media data store 180.

The story engine 140 develops and updates story models. The story engine 140 also collects and assembles media content that can be used to render videos based on story models. In some embodiments, the story engine includes machine learned models that are trained to alter story model parameters according to information such as past story models, viewer feedback metrics to past videos based on the story models, current events, and client preferences. Additional details about the story engine 140 are included in the description of FIG. 2A.

The semantic engine 150 evaluates media assets for use in videos that are generated by the story engine 140. In some embodiments, the semantic engine 150 is used to determine whether non-text content items include applicable subject matter for use in the video. For example, the semantic engine 150 may use machine learning techniques (e.g., convolutional neural networks) to identify the subject of an image and to identify the center of action within the image. The semantic engine 150 can also perform other functions for the video processing system 130. In some embodiments, the semantic engine 150 finds useable content that was not provided by the client, for example, if additional material is needed to generate a video based on a story model. Additional information about the semantic engine 150 is provided in the description of FIG. 2B.

The input data store 160 is software, hardware, firmware or a combination thereof for storing information that is provided to the video processing system 130 by a client for whom the video processing system 130 is producing a video. In some embodiments, the video processing system may not receive this information directly from the client, for example, a system administrator of the video processing system 130 may provide input information in formatted configuration files. Information stored in the input data store 160 may include a smart script, a host source list, and a render profile list. The smart script is a configuration file that describes an abstracted and parameterized version of the story that the client wants presented in a video. In particular, smart scripts describe general concepts and characteristics for story beats that may be used in a story model. Smart scripts are discussed in further detail in the description of the story engine 140 at FIG. 2A. Another type of input stored in the input data store is a host source list. The host source list may be embodied as a document that includes records about accessing content provided by a client. For example, the host source list may include uniform resource locators (URLs) at which the video processing system 130 can access client content (e.g., text, audio, video, and other assets) for use in the video. The input data store 160 also stores a render profile list. The render profile list includes a schedule for when the video processing system 130 is to update the video and may also include a list of adaptation triggers, that is, special circumstances, conditions, or actions that will prompt the video processing system 130 to update the video.

The video processing system 130 is software, hardware, firmware or a combination thereof for storing story models in the story model data store 170. In the process of updating videos, the story engine 140 adapts story models. In some cases, the story engine 140 may provide previous story models as input to a machine model that will be used to create a new story model. Story models stored in the story model data store 170 may also be used to generate new videos.

The media data store 180 is a repository that stores content that the video processing system 130 may include in a video. The media data store 180 may be embodied as a database. The content may include text, audio, video, and images. In one embodiment, the video processing system 130 obtains the content from sources listed in the host source list (e.g., a website associated with a client who requested a video). In some embodiments, the media data store 180 may also contain stock media provided by the video processing system 130 or other media assets that are available for use in a video.

A viewer, client, or other user may be able to access a video through a client device 110. In some embodiments, various client devices may serve different functions for the video processing system 130. A client device 110 may provide a way for a user to view a video produced by the video processing system 130, a client device 110 may be a way for the client who requested the video to provide preferences or feedback, or a client device may be a content server from which the video processing system 130 can retrieve content for use in a video. Client devices 110 can be personal or mobile computing devices such as smartphones, tablets, or notebook computers. In some embodiments, client devices 110 may be web servers or other servers that host content.

Client devices 110 communicate with the video processing system via a network 120. The network 120 may comprise any combination of local area and wide area networks employing wired or wireless communication links. In some embodiments, all or some of the communication on the network 120 may be encrypted.

Figure 2A:
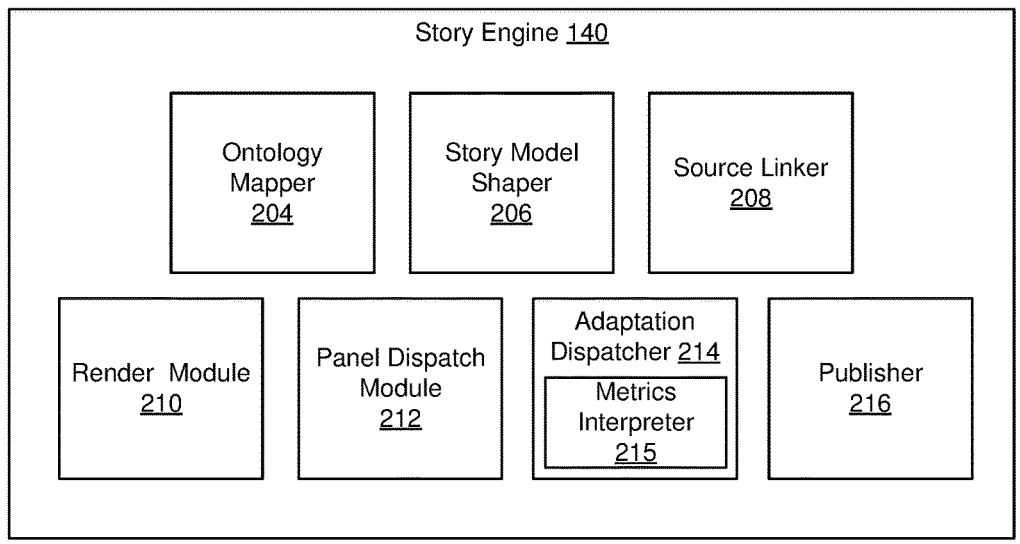
FIG. 2A is a block diagram of a system architecture for a story engine, in accordance with an embodiment.

FIG. 2A is a block diagram of a system architecture for a story engine 140, in accordance with an embodiment. The story engine 140 generates and updates story models and links content to story beats within story models to produce videos. The story engine 140 includes, among other components, an ontology mapper 204, a story model shaper 206, a source linker 208, a render module 210, a panel dispatch module 212, an adaptation dispatcher 214, and a publisher 216. Components of the story engine 140 may be embodied as software modules. In various embodiments, the story engine 140 may contain more, fewer, or different components than those shown in FIG. 2A and the functionality of the components as described herein may be distributed differently from the description herein.

To produce a video, the story engine 140 generates a story model that is based on a smart script. A smart script may be provided by a client, or on behalf of a client, as input to the video processing system 130 when the client requests a new automatable video set. In one embodiment, a smart script is a configuration file that describes, at an abstract level, characteristics for all story beats that are to be made available to a story model. The smart script also describes parameters for video narratives that are generated from story models and scopes to which the video narratives are to be constrained.

When developing a smart script, a client first considers what kind of story the video is going to tell. As several examples, a client may want a video advertising a restaurant, a video describing the life of a historical figure, or a video that shows the weather for a particular area. If a similar video type has been developed before, then the video processing system 130 may supply the client with an existing smart script that the client can alter to suit her needs. Otherwise, the client will need to develop a new smart script to provide to the video processing system 130. A smart script describes individual story beats that may be used in a video narrative. For example, a smart script for a video introducing a small business may include an indication that the video could include the business name, the city where the business is located, the vocation of the proprietor, and promoted skills of employees. That is, the smart script tells the story in a parameterized format using abstracted data classes rather than explicitly listing specific information. The smart script may also include data presentation preferences of the client.

For example, the smart script may indicate that the video should include a storefront photo, a testimonial video, and an animated logo. Further, the smart script may include transition, ordering preferences, and general rule sets for the video. For example, the smart script may be organized into classes such as "story open", "dissolve transition", "animation", "identify subject within first 5 seconds", "close with a flying logo", "insert hyperlinks", and the like. A smart script thus describes portions of a story by listing general parameters that story beats can have.

In some cases, a client may develop a smart script by creating an example story, for example, by storyboarding a specific video narrative. The example story is then tokenized into individual story beats that describe the different portions of the video. A resulting smart script comprises descriptions of the story beats.

The ontology mapper 204 is a software module that parses information associated with the host source list and collects content that may be used in the video from the host sources. The ontology mapper 204 extracts content from sources indicated in the host source list, which is kept in the input data store 160. For example, if the host source list includes source URLs or other data sources, the ontology mapper 204 accesses the URLs and other sources (e.g., via the network 120) and extracts the content. Such content may include text, images, video, and audio. In particular, the ontology mapper 204 collects content in formats that are listed in the smart script. For example, the smart script may describe a story beat in which a still image of a cat is shown, and the ontology mapper 204 would then access the sources to find a still image of a cat. Content extracted by the ontology mapper 204 is processed and then may be stored by the video processing system, for example, in the media data store 180.

The ontology mapper 204 is a software module that passes non-text components to the semantic engine 150 for further processing and analysis. The sematic engine 150 is further described in FIG. 2B. The ontology mapper 204 identifies portions of the text components that are relevant to story beats included in the smart script. The ontology mapper 204 may use natural language processing techniques to categorize information in text components of the content. Natural language processing techniques used by the ontology mapper 204 may include sentence segmentation, tokenization, part of speech tagging, entity detection, and relationship detection. The ontology mapper 204 may also associate each text component with a story beat to which it may be relevant. For example, content with text may be in the form of a review left on a website. The ontology mapper 204 may categorize the content as a testimonial and may associate the content with a story beat in the smart script that indicates that the video could include written testimonials.

The story model shaper 206 is a software module that constructs and adapts story models. That is, the story model shaper 206 develops a story model upon receipt of a new smart script and also adapts existing story models based on a variety of viewer feedback metrics, described below in detail with reference to a panel dispatch module 212. A story model can be thought of as a sequence of story beats, the contents, length, characteristic parameters, and order of which are determined by the original smart script. The story model shaper 206 creates such a sequence of story beats to form an initial story model.

A story model may be represented by any number of dimensions of parameters. That is, for a story model described by n parameters, each story beat may be characterized by n values. Examples of parameters that may be associated with a story beat include market target, depth, popularity, seasonality, location specificity, target age demographic, target income demographic, timeliness, style type, irreverence level, color scheme, length of time within the story, etc. Some parameters may be represented by relative value (e.g., length of story beat in video) while other parameter values may represent categorization (e.g., where specific parameter values are assigned to different color schemes, styles, or target demographic groups).

In the initial story model, parameters associated with story beats are instantiated with equal parameter values for all story beats. The story model shaper 206 then amplifies or attenuates values assigned to parameters for each story beat, for example, according to preferences indicated in the smart script. Adjusting the parameters associated with story beats alters the shape of the story model. As such, a story model can be conceptualized as having a "wave shape" that represents the changes in story beat parameters over the course of a story.

In one embodiment, the story model shaper 206 adjusts parameters of the initial story model according to vectors whose values may be assigned in the smart script. In some cases, the vectors are a business class vector, a customer class vector, and an engagement class vector. These three vectors may include adjustments to make to parameters of each story beat in a story model, effectively tuning the wave shape of the story model according to target viewer demographics. A business class vector is a set of parameter values representing the kind of interaction that is to be described in the video, a customer class vector is a set of parameter values representing the profiles of viewers in the target demographic, and an engagement class vector is a set of parameter values indicating whether target viewers are new or returning viewers with respect to the topic of the video (e.g., if target viewers have accessed a website associated with the video subject before).

For example, if the story model shaper 206 is used to shape a video for a 24-hour plumbing business that is aimed at low-middle-income males who are new to the business, the story model shaper 206 may amplify values of story beat parameters associated with low cost, basic services, certification, and positive reviews, and may attenuate parameters associated with custom plumbing, sales of luxury fixtures, photos of large homes, etc.

In addition to generating new story models, the story model shaper 206 can adapt existing story models. For example, the story model shaper 206 can change the shape of a story model in accordance with client-scheduled parameters (e.g., a client schedules a video update for holidays, or every two months). The story model shaper 206 may also adapt a story model in response to viewer reactions to the video produced based on the story model (e.g., to avoid a tendency to lose viewers at a specific point in the video). Such a process of dynamic adaptation allows story models to evolve as the model is altered to have different wave shapes over time.

To adapt an existing story model, the story model shaper 206 accepts data about viewer feedback metrics from the adaptation dispatcher 214. The viewer response data is used to instantiate new iterations of existing videos by improving past story models and generating new videos. The story model shaper 206 includes machine learning algorithms that evaluate and alter an existing wave shape. Examples of semi-supervised algorithms that may be used by the story model shaper include Ordinary Least Squares Regression and Multivariate Adaptive Regression Splines. The semi-supervised machine learning algorithms are used to train machine models of the story model shaper to recognize successful story wave shapes. For example, the algorithms may train machine models using story wave shapes (e.g., from past iterations of videos) that are labeled as successful or unsuccessful at engaging viewers. The semi-supervised machine learning algorithms may also train machine models for adjusting wave shape parameters for story models based on inputs including viewer feedback metrics. The description of FIG. 4 further discusses use of machine learned models and algorithms to adjust a story model.

Examples of unsupervised machine learning algorithms that may be used by the story model shaper 206 include the Apriori algorithm and k-Means Clustering. The unsupervised algorithms may be used by the story model shaper 206 to analyze relationships between viewer feedback metrics and wave shapes of story models. In some embodiments, such relationship information may be used to train machine models from which the semi-supervised algorithms can learn information about how a story wave shape can affect viewer engagement. As one example, an unsupervised algorithm may classify story models into different classes of wave shapes and may identify similarities and differences in viewer feedback metrics for each class of wave shape which can then be used to train another machine model to generate story models with wave shapes that have a likelihood of producing videos of interest to a particular demographic.

After a story model has been generated and shaped (or re-shaped in the case of story model adaptation), the source linker 108, which may be embodied as a software module, links media assets from the media data store 180 to the individual story beat elements within the story model. To link content to a story beat element, the source linker 108 identifies a content item that matches the parameter values of the story beat and that content item may be assigned to the story beat. For example, if a story beat includes parameters describing use of a positive text review of a restaurant as a part of a promotional video for the restaurant, the source linker 208 may access the media data store 180 to search for positive testimonials, as identified by the ontology mapper 204. In some embodiments, the content in the media data store 180 may already be suggested for use with a particular story beat in view of initial analysis from the ontology mapper 204.

The render module 210 is a software module that assembles the content identified by the source linker 208 and renders it into a video. In some embodiments, video rendering may be handled by a separate render farm system, by a virtual machine cluster, or by a single computing device, such as the video processing system 103. The render module 210 may render the video into multiple machine-dependent resolutions as may be stipulated in the render profile list stored in the input data store 160. After it is rendered, physical video files may be stored, and served, by the video processing system 130 or on a separate server platform. The physical video files can be played back by video-enabled client devices 110 (e.g., cell phones, tablets, personal computers, smart televisions, etc.).

The publisher 216 is a software module that can deliver a universal embed code to the client who requested the video (or to a representative content management system). A universal embed code may be embodied as a block of hypertext markup language (HTML) that includes an object (e.g., the video) in a webpage. The universal embed code allows a client device 110 to access the video. The client can include the embed code in locations, such as on a website, where they want the video to be accessed by viewers. In other embodiments, the publisher 216 may provide the embed code or the video file itself to an outside video distribution system. Such a distribution method may be supported by third party programmatic service providers that offer direct publishing of auto-generated videos.

The first time a story model is rendered into a video, the panel dispatch module 212, which is a software module, may send the video to an outside review service to receive a first set of viewer feedback metrics about the video. A video based on a newly generated story model has not been improved in view of reactive input and thus may not be ready for release to public viewers. The panel dispatch module 212 assigns a video to an outside panel service, for example, to a focus group of users who will provide feedback. The video is viewed by a pre-selected group of humans who interact with an application on a client device 110 to view and react to the video. The application on the client device 110 may be designed to collect viewer feedback metrics such as points where the video was paused, points where the video was stopped, whether portions of the video were replayed, etc. The panel dispatch module 212 receives the viewer feedback metrics generated by the viewing users and transmits it to the metrics interpreter 215 in the adaptation dispatcher 214 for analysis.

The adaptation dispatcher 214 is a software module that indicates when and how a story model is to be adapted or a new video is to be generated. The adaptation dispatcher 214 accesses information stored in the input data store 160 related to source web pages and schedules from the render profile list to determine when a story model or video is to be updated. The adaptation dispatcher 214 may trigger updates in view of a client update schedule that may request, for example, daily, weekly, holiday, or other situational updates.

The adaptation dispatcher 214 also includes a metrics interpreter 215. The metrics interpreter 215 receives viewer feedback metrics and evaluates whether the story model of a video ought to be adapted or whether the video ought to be re-rendered based on the existing story model. In one embodiment, the metrics interpreter 215 uses viewer feedback metrics to determine whether a story model or video is to be updated. For example, the metrics interpreter 215 may be programmed to determine that a story model needs to be adjusted whenever a certain percentage of viewers do not complete watching the associated video. When the adaptation dispatcher 214 determines that that a story model needs to be updated, it triggers a response from the story model shaper 206 which will update the story model based on the viewer feedback metrics. Similarly, when the adaptation dispatcher 214 determines that a video needs to be re-rendered (but that the video does not need a new story model) the source linker 208 may collect new sources for use in an updated video (e.g., to create a video with content from an updated client website).

Figure 2B:
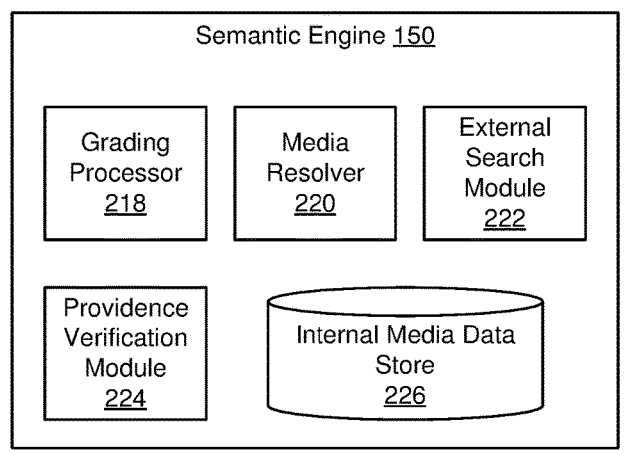
FIG. 2B is a block diagram of a system architecture for a semantic engine, in accordance with an embodiment.

FIG. 2B is a block diagram of a system architecture for a semantic engine 150, in accordance with an embodiment. The semantic engine 150 analyzes non-textual content that was collected by the ontology mapper 204. The semantic engine 150 may also access and collect additional content if the ontology mapper 204 was not able to find enough or adequate content at sources listed in the host source list. The semantic engine 150 includes, among other components, a grading processor 218, a media resolver 220, an external search module 222, a providence verification module 224, and an internal media data store 226. Components of the semantic engine 150 may be embodied as software modules. In various embodiments the story engine 140 may contain more, fewer, or different components than those shown in FIG. 2B and the functionality of the components as described herein may be distributed differently from the description herein.

The grading processor 218 is a software module that identifies specific subjects of videos, images, and audio. To do so, the grading processor 218 may use image processing techniques including convolutional neural networks. The neural networks or other image processing models may be trained using a set of training images prior to use in the grading processor 218. In addition to identifying the subjects of images, the grading processor 218 may also determine the center of action of a content item and other information such as level of exposure or effective resolution. This information can be used later by the source linker 208, for example to determine portions of an image to display most prominently in a rendered video.

The media resolver 220 is a software module that evaluates each individual content asset and either accepts or rejects the content item for use in a video. In one embodiment, the media resolver 220 analyzes content after it has been analyzed by the grading processor 218, and the media resolver 220 may use data generated by the grading processor 218 when analyzing content. To determine whether a piece of content is useable, the media resolver 220 may employ image processing techniques including trained neural networks. In the case of the media resolver 220, the image processing algorithms are trained with training data including content labeled as having a success or failure state. For example, the image processing models may be trained to identify blurry images as failure states and to reject them for use in videos. Content that is not accepted for use in the video is marked and may be used as an example of a failure state when the image processing algorithms are trained in the future.

The external search module 222 is a software module that finds content items that were not found in host sources by the ontology mapper 204. Additionally, the media resolver 220 may alert the external search module 222 to find content items if the content that the ontology mapper 204 identified from a host source was not accepted for use in a video. The external search module 222 executes directed asset searches to find content that has available rights control and providence data and which matches story beat requirements that were unmet in the content search conducted by the ontology mapper 204. For example, if a story beat defined in a smart script includes a still image of a dog and the ontology mapper 204 was not able to find a still image of a dog on the client website, the external search module 222 may search the Internet for a still image of a dog that is available for use.

The providence verification module 224 is a software module that determines the usage rights or providence of media content. In one embodiment, the providence verification module 224 only verifies usage rights for media assets accessed by the external search module 222, as other content is known to originate from client source locations listed in the host source list. Input to the providence verification module 224 may be in the form of images or sets of still frames exported from motion video clips. For example, the providence verification module 224 may perform a combination of automated search by image and reverse image searches. If usage rights can be determined for the content and if the usage rights allow for use of the content, then the media asset is marked as usable. Otherwise the content is deleted from the video processing system 130.

Usable content collected from locations other than the client sources may be stored in the internal media data store 226. The internal media data store 226 may be embodied as a database. That is, the content (e.g., video clips, images, and audio) stored in the internal media data store 226 has been analyzed and identified by the grading processor 218, and has been allowed for use in a video by the media resolver 220 and the providence verification module 224. Content in the internal media data store 226 may be accessed by modules of the story engine 140 to link to story beats in a story model and to subsequently include in videos.

Story Models

Figure 3:
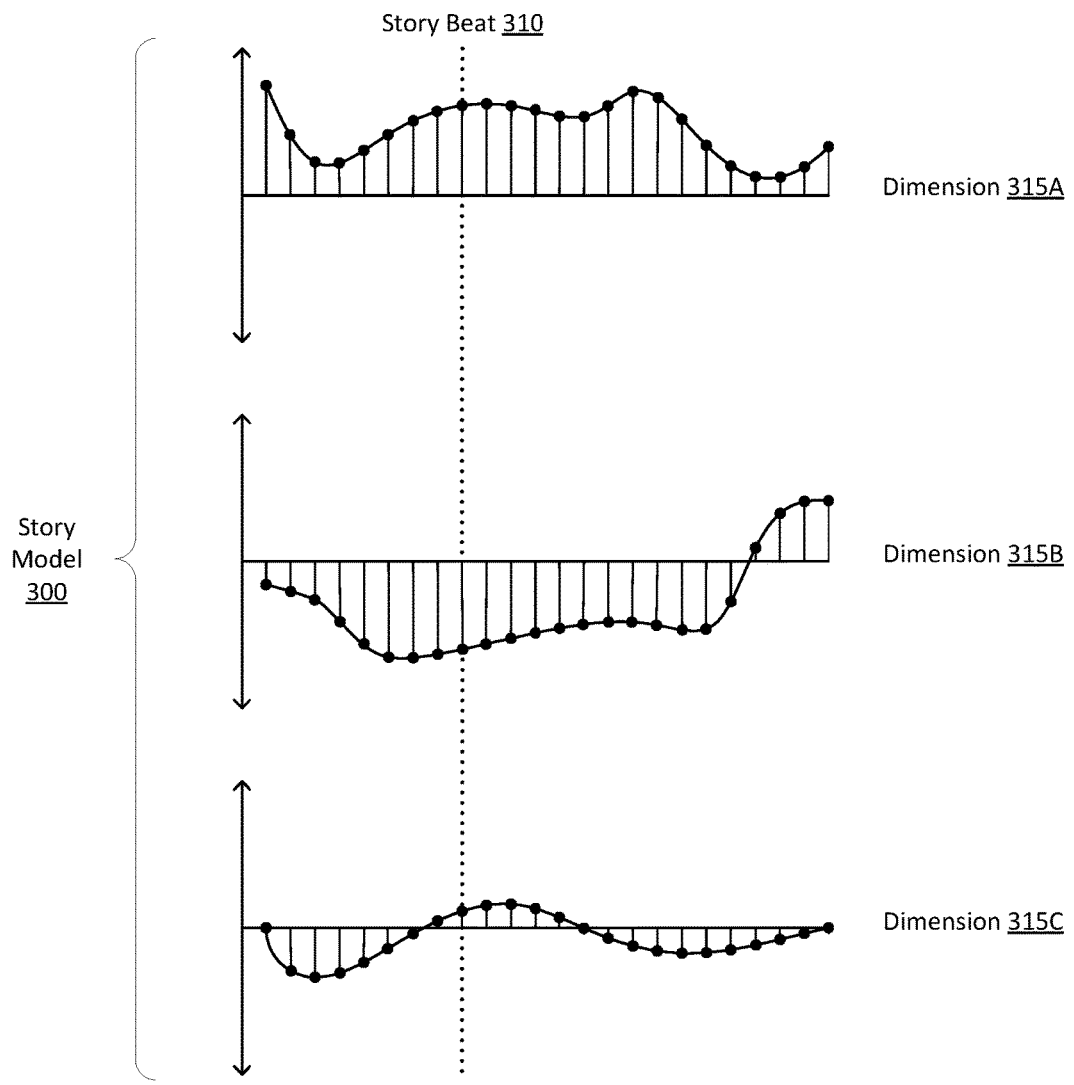
FIG. 3 is an example illustration of a story model, in accordance with an embodiment.

FIG. 3 is an example illustration of a story model 300, in accordance with an embodiment. As mentioned previously, a story model 300 is a data set that defines planned characteristics of a video. Such characteristics may be more generally defined by a smart script. The example of FIG. 3 is just one possible way of conceptualizing the components of a story model 300. In particular, a story model 300 comprises a sequence of story beats 310. One example story beat 310 is emphasized in FIG. 3 with a dotted line that passes through several lines indicating different parameter values. A story beat 310 is a set of parameter values that represent a portion of a video. A story model 300 may be defined by multiple dimensions 315 of parameters. In the example of FIG. 3, three dimensions 315 are shown. Each dimension 315 represents values of one parameter of the video and each story beat 310 includes defined parameter values for each of the dimensions 315. Examples of parameters that may be used to characterize a story model 300 include length of story beat, color scheme, style, audio type, volume, mood, content type, seasonality, etc. In some dimensions, parameter values may represent relative amounts, for example, in the case of seasonality, story beat length, or volume. In other dimensions, parameter values may represent categorizations, for example, style, color scheme, mood, content type (e.g., show a still image, video, audio, etc.) and the like.

When the story model shaper 206 adjusts a story model 300, it is changing the values associated with parameters for each dimension 315 for each story beat 310. In some cases, the story model shaper 206 may also reorder story beats within the story model 300. Rearranging the order of the story beats 310 causes content to be presented in a different order when a video is generated based on the story model 300. For example, in a story model 300 for a video advertising a company, a story beat that defines an animated logo may be moved to come before a story beat that defines a short video clip of an employee of the company.

A story wave shape is defined by the way values of parameters in all dimensions 315 change over the course of the story. Curves are drawn along the parameter values in FIG. 3 to illustrate story wave shapes. A full story wave shape could be conceptualized as an overlay of all the wave shapes for every dimension 315 used in a story model 300.

Generating and Updating the Story Model

Figure 4:
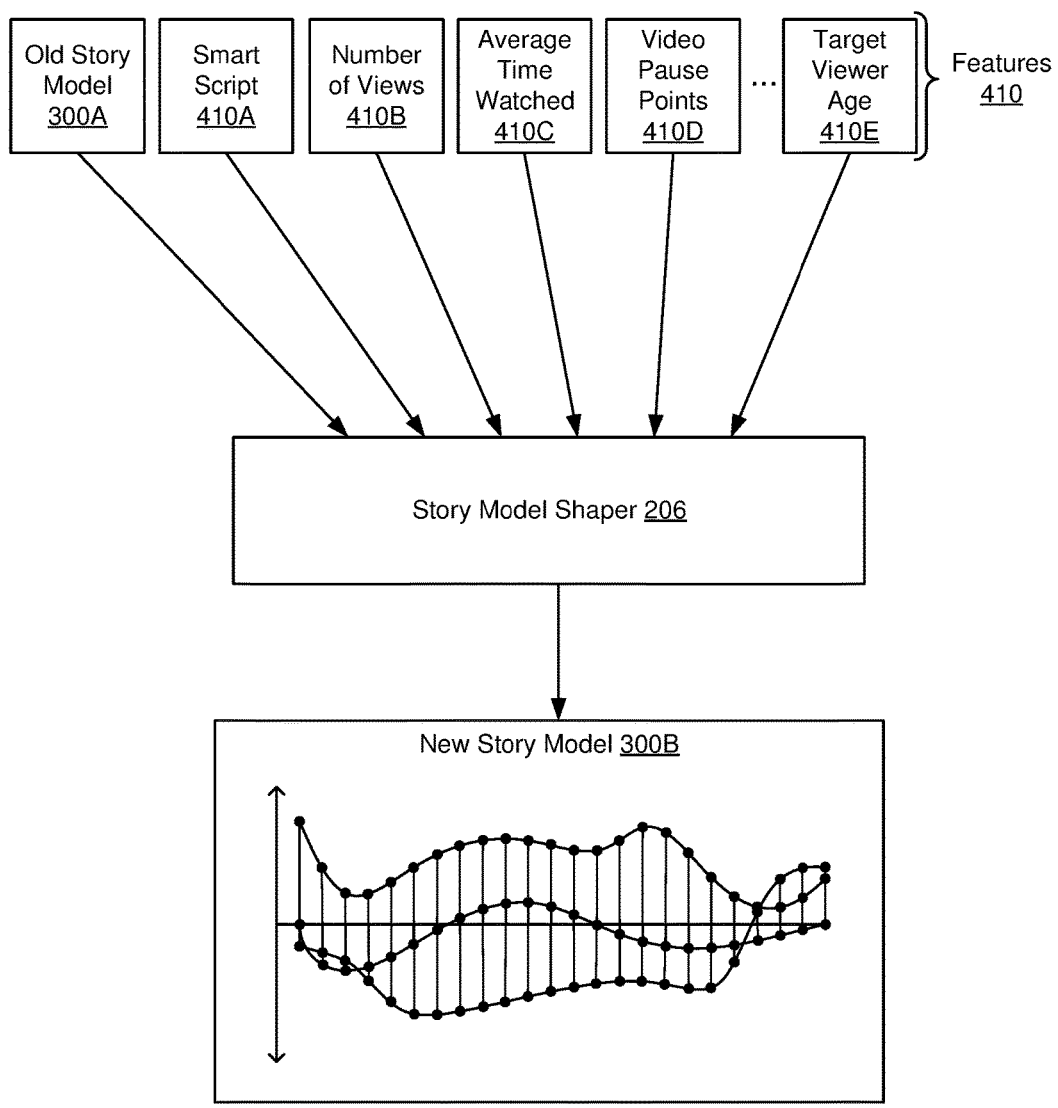
FIG. 4 is an example illustration of automatic story model generation using machine models, in accordance with an embodiment.

FIG. 4 is an example illustration of automatic story model generation using machine models, in accordance with an embodiment. As mentioned previously in the description of FIG. 2A, the story model shaper 206 generates and adapts story models 300. In one embodiment, the story model shaper 206 includes trained machine models to which machine learned algorithms may be applied to produce a new story model 300. That is, the story model shaper 206 includes trained machine models that can be used to update parameters and ordering of story beats 310 within a story model 300 in view of a variety of inputs.

In one example embodiment, a machine model of the story model shaper 206 is trained using labeled training data. The training data may include versions of past story models 300 as well as features that were associated with the story models 300. Additionally, the training data may be labeled, in the case of supervised or semi-supervised learning algorithms. For example, a past story model 300 used for training a machine model to generate story models 300 may include a label indicating whether the video generated based on the past story model 300 was successful or not (e.g., whether viewers watched and liked the video).

Prior to generating a story model 300, the story model shaper 206 receives features 410 as input. The features 410 may include information about one or more previous iterations of the story model 300, viewer feedback metrics, identifications of target demographics, and other client preferences. The first time a story model is shaped, the features 410 may not include information such as previous iterations of the story model or feedback from viewers. FIG. 4 shows a few example input features 410 that may be provided to the story model shaper 206, including the old story model 300A that was previously presented to viewers, the smart script 410A, the number of views a video based on the previous story model 300A received, an average time viewers spent watching the video 410C, time points at which viewers paused the video 410D, and a target age of viewers for whom the video is being produced 410E.

The features 410 are applied to a trained machine model by the story model shaper 206. The story model shaper 206 uses algorithms associated with the trained machine models to generate a new story model 300B based on the input features 410. For example, the story model shaper 206 algorithms may attenuate and amplify parameter values for each story beat 310 and may also reorder story beats 310 within the story model 300. The new story model 300B is then linked to content, rendered, and published as an updated version of the video. In some embodiments, additional machine learning algorithms are used by the story model shaper 206 to classify successful story models 300. For example, a particular story wave shape may be especially effective at producing videos that engage the teenage demographic, and a machine learning algorithm may notice such a pattern. In those cases, classifications and correlations between features 410 and successful story models 300 may be used to train future machine learned models for generating effective story models 300.

Process

Figure 5:
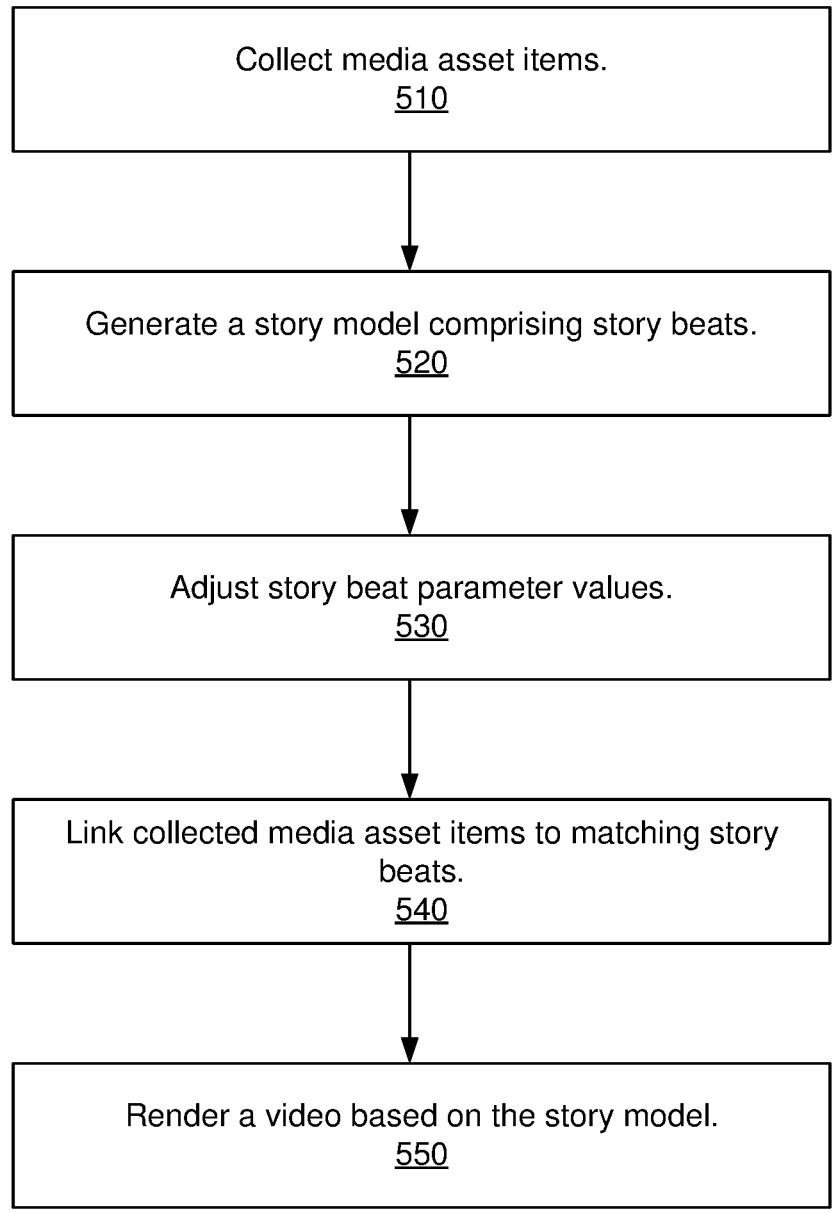
FIG. 5 is a flowchart illustrating a process for generating a video using a story model, in accordance with an embodiment.

FIG. 5 is a flowchart illustrating a process for generating a video using a story model, in accordance with an embodiment. The video processing system 130 collects 510 media asset items. The media asset items may be content collected from sources associated with a client (e.g., a client website) as listed in the host source list. In some cases, the client sources may not have all of the types of media asset items needed to populate story beat concepts that are described in the smart script. In such cases, the video processing system may access content from other sources.

The video processing system 130 generates 520 a story model that includes story beats. The story model describes a general idea of a story and includes an ordered sequence of story beats (i.e., portions of the story). The individual story beats may be generally described in the smart script, although the story model may use only a subset of the story beats from the smart script in some embodiments. The video processing system adjusts 530 story beat parameter values. In one embodiment, values associated with story beat parameters are determined by machine learning algorithms using machine models that have been trained to improve story models given input features related to story preferences and target demographics. In some embodiments, the algorithms also reorder story beats within the story model.

After a story model has been adjusted, the video processing system 130 links 540 collected media asset items to story beats within the story model. A media asset item may be linked to a story beat if its characteristics meet the criteria of the story beat parameters. A video is rendered 550 based on the story model. The video includes the media assets that are linked to the story beats in the story model. The process may be repeated to improve and update the video over time.

In various embodiments, the video processing system 130 may generate videos by an alternative process to the example shown in FIG. 5, or may perform the steps of FIG. 5 in a different order. For example, in one embodiment, the video processing system 130 may adjust story beat parameters of an existing story model without collecting new media asset items. In another example embodiment, the video processing system 130 may collect new media asset items and link the newly collected media asset items to the matching story beats in an existing story model without adjusting the story beat parameter values.

Hardware Components

Figure 6:
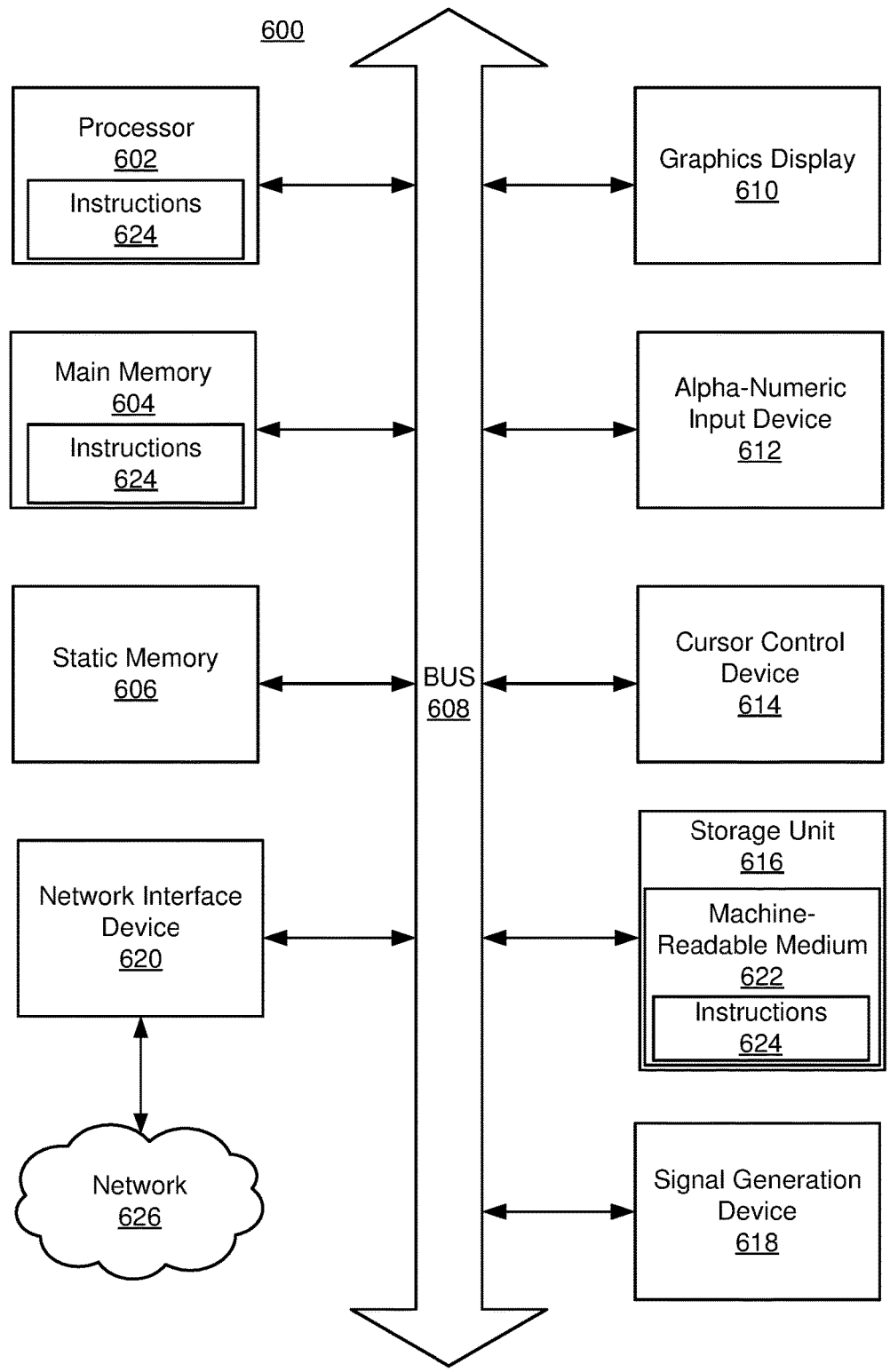
FIG. 6 is a block diagram illustrating components of an example machine able to read instructions from a machine-readable medium and execute them in one or more processors (or controllers) in accordance with an embodiment.

FIG. 6 is a block diagram illustrating components of an example machine able to read instructions from a machine-readable medium and execute them in one or more processors (or controllers). Specifically, FIG. 6 shows a diagrammatic representation of video processing system 130 in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include instructions for implementing the functionalities of the story engine 140, and the semantic engine 150. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but may not be limited to, data repositories in the form of solid-state memories, optical media, and magnetic media.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product that includes a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method for automatic video generation comprising:
    accessing a smart script document defining story beats, each of the story beats represented by values indicative of characteristics of a segment of a narrative story;
    generating a story model comprising a sequence of a subset of the story beats in the smart script document, the story model representing an ordered sequence of the subset of the story beats;
    adjusting values associated with each story beat in the story model;
    adjusting an order of the sequence of story beats within the story model;
    linking media asset items to the subset of the story beats in the story model; and
    rendering a video to incorporate media asset items linked to the subset of the story beats in the story model in the same order as the subset of story beats in the story model.

2. The computer-implemented method of claim 1, further comprising:
    receiving a smart script document describing characteristics of story beats that may be included in a video, each story beat description including characteristics of corresponding media asset items.

3. The computer-implemented method of claim 1, further comprising:
    receiving a host source list including records for accessing content provided by a client.

4. The computer-implemented method of claim 3, further comprising collecting the media asset items from sources listed in the host source list.

5. The computer-implemented method of claim 4, further comprising:
    identifying media asset item descriptions that are listed in the smart script document but for which corresponding media asset items were not collected from a source of the host source list; and
    collecting the missing media asset items from other locations accessible over a network.

6. The computer-implemented method of claim 1, wherein adjusting values associated with parameters of each story beat comprises:
    providing information about the smart script document, a target demographic for the video, and parameters associated with previous iterations of the story model to a machine model that is trained to generate story models; and
    receiving, from the machine model, a new version of the story model.

7. The computer-implemented method of claim 1, further comprising:
    publishing the video;
    receiving viewer feedback metrics from at least one viewer of the video;
    modifying, based on the viewer feedback metrics, the values associated with parameters of the subset of the story beats in the story model to create a new story model;
    linking updated media asset items corresponding to the modified values of the subset of the story beats in the new story model; and
    rendering a new video to incorporate the updated media asset items.

8. The computer-implemented method of claim 1, wherein linking a collected media asset item to a story beat in the story model comprises selecting a media asset item that has characteristics that are described by parameter values of the story beat.

9. The computer-implemented method of claim 1, wherein parameters associated with each story beat include at least one of: length of time, visual form, and media type of the story beat.

10. The computer-implemented method of claim 1, further comprising:
    identifying, using a trained convolutional neural network, media asset items that are not acceptable for use in a video.

11. A computer system for automatic video generation comprising:
    a processor for executing computer program instructions; and
    a non-transitory computer-readable storage medium storing computer program instructions executable by the processor to perform steps comprising:
        accessing a smart script document defining story beats, each of the story beats represented by values indicative of characteristics of a segment of a narrative story;
        generating a story model comprising a sequence of a subset of the story beats in the smart script document, the story model representing an ordered sequence of the subset of the story beats;
        adjusting values associated with each story beat in the story model;
        adjusting an order of the sequence of story beats within the story model;
        linking media asset items to the subset of the story beats in the story model; and
        rendering a video to incorporate media asset items linked to the subset of the story beats in the story model in the same order as the subset of story beats in the story model.

12. The computer system of claim 11, the steps further comprising:
    receiving a smart script document describing characteristics of story beats that may be included in a video, each story beat description including characteristics of corresponding media asset items.

13. The computer system of claim 11, the steps further comprising:
receiving a host source list including records for accessing content provided by a client.

14. The computer system of claim 3, the steps further comprising collecting the media asset items from sources listed in the host source list.

15. The computer system of claim 14, the steps further comprising:
identifying media asset item descriptions that are listed in the smart script document but for which corresponding media asset items were not collected from a source of the host source list; and
collecting the missing media asset items from other locations accessible over a network.

16. The computer system of claim 11, wherein adjusting values associated with parameters of each story beat comprises:
providing information about the smart script document, a target demographic for the video, and parameters associated with previous iterations of the story model to a machine model that is trained to generate story models; and
receiving, from the machine model, a new version of the story model.

17. The computer system of claim 11, the steps further comprising:
publishing the video;
receiving viewer feedback metrics from at least one viewer of the video;
modifying, based on the viewer feedback metrics, the values associated with parameters of the subset of the story beats in the story model to create a new story model;
linking updated media asset items corresponding to the modified values of the subset of the story beats in the new story model; and
rendering a new video to incorporate the updated media asset items.

18. The computer system of claim 11, wherein linking a collected media asset item to a story beat in the story model comprises selecting a media asset item that has characteristics that are described by parameter values of the story beat.

19. The computer system of claim 11, wherein parameters associated with each story beat include at least one of: length of time, visual form, and media type of the story beat.

20. A video sequence generated by a method comprising:
accessing a smart script document defining story beats, each of the story beats represented by values indicative of characteristics of a segment of a narrative story;
generating a story model comprising a sequence of a subset of the story beats in the smart script document, the story model representing an ordered sequence of the subset of the story beats;
adjusting values associated with each story beat in the story model;
adjusting an order of the sequence of story beats within the story model;
linking media asset items to the subset of the story beats in the story model; and
rendering the video to incorporate media asset items linked to the subset of the story beats in the story model in the same order as the subset of story beats in the story model.

* * * * *